US006463578B1

United States Patent
Johnson (12) United States Patent
(10) Patent No.: US 6,463,578 B1
(45) Date of Patent: Oct. 8, 2002

(54) SYSTEMS, METHODS AND COMPUTER PROGRAM PRODUCTS FOR DEBUGGING JAVA SERVER PAGE FILES USING COMPILED JAVA CLASS FILE MODIFICATIONS

(75) Inventor: David Phillip Johnson, Apex, NC (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 09/447,140

(22) Filed: Nov. 23, 1999

(51) Int. Cl.[7] .................................................. G06F 9/44
(52) U.S. Cl. ........................ 717/124; 717/116; 717/131; 717/126
(58) Field of Search ................................ 717/124, 125, 717/129, 131, 137, 38, 116, 126; 703/22

(56) References Cited

U.S. PATENT DOCUMENTS

| | | | | |
|---|---|---|---|---|
| 5,124,989 A | * | 6/1992 | Padawer et al. ............... 174/38 |
| 5,319,645 A | * | 6/1994 | Bassi et al. .................... 714/38 |
| 5,371,747 A | * | 12/1994 | Brooks et al. ................. 714/38 |
| 5,426,648 A | * | 6/1995 | Simamura ...................... 714/38 |
| 5,432,795 A | * | 7/1995 | Robinson ..................... 717/125 |
| 5,740,440 A | * | 4/1998 | West .......................... 717/125 |
| 5,764,989 A | * | 6/1998 | Gustafsson et al. .......... 717/129 |
| 5,778,230 A | * | 7/1998 | Wimble et al. .............. 717/131 |
| 5,784,553 A | * | 7/1998 | Kolawa et al. ................ 714/38 |
| 5,848,246 A | * | 12/1998 | Gish ........................... 709/228 |
| 5,892,941 A | * | 4/1999 | Khan et al. .................... 703/22 |
| 5,901,315 A | * | 5/1999 | Edwards et al. ............. 717/124 |
| 6,081,665 A | * | 6/2000 | Nilsen et al. ................ 717/116 |
| 6,119,247 A | * | 9/2000 | House et al. .................. 714/38 |
| 6,151,618 A | * | 11/2000 | Wahbe et al. .................. 709/1 |
| 6,226,786 B1 | * | 5/2001 | Hickman et al. ............ 717/124 |
| 6,256,752 B1 | * | 7/2001 | Blandy et al. ................. 714/38 |
| 6,260,187 B1 | * | 7/2001 | Cirne .......................... 717/110 |
| 6,353,897 B1 | * | 3/2002 | Nock et al. .................... 714/38 |

OTHER PUBLICATIONS

Title: A Formal Framework for Java Bytecode Language and verifier, author: Freund et al, ACM, Oct., 1999.*
Title: Criteria for Testing Exception–Handling constructs in Java Programs, Sinha et al, IEEE, Aug. 1999.*
Title: Java Development Environments (Panel), author: Wasserman, ACM, 1997.*
"Chapter 3, The Structure of the Java Virtual Machine," The Java Virtual Machine Specification, Sun Microsystems, Inc., 1999 (http://java.sun.com/docs/books/vm . . . nd–edition/html/Overview.doc.html).*

* cited by examiner

Primary Examiner—Gregory Morse
Assistant Examiner—Chameli C. Das
(74) Attorney, Agent, or Firm—Myers Bigel Sibley & Sajovec; A. Bruce Clay (57) ABSTRACT

Systems, methods and computer program products are provided for debugging markup language source code of JSP files via Java class files generated therefrom. A Java class file is subjected to introspection to locate a source file specifier that identifies the filename of a Java source file from which the Java class file was compiled. The Java class file is also subjected to introspection to identify one or more source-to-bytecode tables associated with the Java class file. Identified source-to-bytecode tables are modified to include information provided within the comments of the Java source file source code to link respective portions of the Java source code with respective portions of the markup language source code of the JSP file. The located source file specifier is modified to indicate the JSP file as the source file from which the Java class file is compiled.

36 Claims, 6 Drawing Sheets

USER.JSP

```
1  <%@page import="hello.NameHandler"%>
2  <jsp:useBean id="mybean" scope="page"
3    class="hello.NameHandler"/>
4  <jsp:setProperty name="mybean" property="*"/>
5  <html>
6  <head><title>Hello, User</title></head>
7  <body bgcolor="#ffffff" background="background.gif">
8  <%@include file="dukebanner.html"%>
9  <table border="0" width="700">
10 <tr>
11 <td width="150">   </td>
12 <td width="550">
13 <h1>My name is Duke. What's yours?</h1>
14 </td>
15 </tr>
16 <tr>
17 <td width="150">   </td>
18 <td width="550">
19 <form method="get">
20 <input type="text" name="username" size="25">
21 <br>
22 <input type="submit" value="Submit">
23 <input type="reset" value="Reset">
24 </td>
25 </tr>
26 </form>
27 </table>
28 <%
29 if (request.getParameter("username") !=null){
30 %>
31 <%@include file="response.jsp" %>
32 <%
33 }
34 %>
35 </body>
36 </html>
```

USER.JAVA

```
153 package hello;
154 public class NameHandler {
155   private String username;
156   public NameHandler() {
157     username = null;
158   }
159   public void setUsername(String name) {
160     username = name;
161   }
162   public String getUsername() {
163     return username;
164   }
165 }
```

COMPILER

USER.CLASS
Bytecode 1
Bytecode 2
Bytecode 3
Bytecode 4
Bytecode 5
Bytecode 6
Bytecode 7
Bytecode 8
Bytecode 9
Bytecode 10

My name is Duke. What's yours?
[Submit] [Reset]
Hello, Jon !

SYSTEMS, METHODS AND COMPUTER PROGRAM PRODUCTS FOR DEBUGGING JAVA SERVER PAGE FILES USING COMPILED JAVA CLASS FILE MODIFICATIONS

FIELD OF THE INVENTION

The present invention relates generally to computer software development and, more particularly, to computer software debugging.

BACKGROUND OF THE INVENTION

Java is an object-oriented programming language developed by Sun Microsystems, Mountain View, California. Java is a portable and architecturally neutral language. Java source code is compiled into a machine-independent format that can be run on any machine with a Java runtime system known as the Java Virtual Machine (JVM). The JVM is defined as an imaginary machine that is implemented by emulating a processor through the use of software on a real machine. Accordingly machines running under diverse operating systems, including UNIX, Windows 95, Windows NT, and MacIntosh having a JVM can execute the same Java program.

Java Server Page (JSP) technology is a scripting language technology for controlling the content or appearance of Web pages through the use of server-side applications, known as "servlets." Servlets are Java applications that run on a Web server to modify Web pages before they are sent to requesting clients. Servlets may be referred to as server-side applets or applications. Similar to the way applets run on a browser and extend a browser's capabilities, servlets run on a Java-enabled Web server and extend the Web server's capabilities. Servlets use classes and methods in the JavaSoft Java Servlet Application Programming Interface (API). The JavaSoft Java Servlet Application Programming Interface (API) is described at http://www.ibm.com/java/servexp/sedocd.html, which is incorporated herein by reference in its entirety. As is known to those skilled in this art, servlets may be local or remote. That is, servlets may reside on a Web server receiving a request from a Web client or may be located on a server remotely located from the Web server receiving a Web client request.

In response to a client request for a Web page, a JSP file referred to in the requested Web page typically is transformed into (or may call) one or more servlets that execute. A JSP file typically contains source code in a markup language, such as HyperText Markup Language (HTML) and Extensible Markup Language (XML). This source code typically includes all the information needed to call one or more servlets. A servlet typically generates an HTML response to a requesting client.

As is known to those of skill in the art, "debugging" is the process of locating and fixing or bypassing bugs (errors) in computer program code. Debugging tools are typically available for various software development environments and can be used to help identify coding errors. Many programming language packages include a debugger tool for checking code for errors as it is being written. A debugger tool typically facilitates stepwise (i.e., line-by-line) execution of program instructions that is frozen at prescribed execution intervals to allow user inspection of various aspects of program execution.

Conventional compilers for compiling JSP files into Java class files create an intermediate Java source file that is not visible to the JSP file creator. However, existing debugger tools for debugging a compiled Java class file typically displays the source code of the intermediate Java source file as the source of the Java class file, not the markup language source code of the JSP file. Unfortunately, because an intermediate Java source file is not created by the JSP file creator, the source code of an intermediate Java source file may be of little use to a developer in debugging the original JSP file. Accordingly, there is a need for a debugger that allows a developer to debug a generated Java class file by stepping through the source code of the original JSP file from which the Java class file was generated.

SUMMARY OF THE INVENTION

The present invention is directed to systems, methods and computer program products for debugging markup language source code of JSP files via Java class files generated therefrom. The markup language source code within a JSP file is converted to an intermediate Java source file when a client request is directed to the JSP file. The Java source file contains source code in the Java programming language. According to the present invention, non-executable comments are included within the Java source code of an intermediate Java source file to identify portions of the Java source code that correspond to respective portions of the markup language source code in the JSP file.

According to the present invention, debugging operations can be performed on a JSP file using a Java class file generated therefrom. A Java class file is subjected to introspection to locate a source file specifier that identifies the filename of a Java source file from which the Java class file was compiled. The Java class file is also subjected to introspection to identify one or more source-to-bytecode tables associated with the Java class file. A source-to-bytecode table includes information that associates bytecode therewithin to respective portions of Java source code within a Java source file identified by a source file specifier.

According to the present invention, the identified source-to-bytecode tables are modified to include information provided within the comments of the Java source file source code to link respective portions of the Java source code with respective portions of the markup language source code of the JSP file. This modification provides a link between respective bytecodes within the Java class file and respective portions of the markup language source code of the JSP file.

In addition, the located source file specifier is modified to indicate the JSP file as the source file from which the Java class file is compiled. This may be implemented by changing the file name of the Java source file in the source file specifier to the file name of the JSP file.

After the source-to-bytecode tables have been modified as described above and the source file specifier has been modified to indicate the JSP file as the source file of the Java class file, the Java class file can be executed within a JVM debugger tool to debug the markup language source code of the JSP file. The debugger tool is thereby "fooled" into believing that the markup language source code of the JSP file matches the bytecode of the compiled Java class file. A user can thereby step through the markup language source code during debugging operations.

BRIEF DESCRIPTION OF THE DRAWINGS

FIG. 1 also schematically illustrates the conversion of the JSP file to a Java source file which is compiled into a Java class file and executed to generate a response to be sent back to the client.

FIG. 2 illustrates markup language source code within the JSP file of FIG. 1. FIG. 2 also schematically illustrates the conversion of the JSP file to an "intermediate" Java source file containing Java language source code representing the markup language source code of the JSP file. FIG. 2 also schematically illustrates compiling the Java source file into a Java class file containing bytecode representing the Java source code.

DETAILED DESCRIPTION OF THE INVENTION

The present invention now is described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout the description of the drawings.

The Internet

The Internet is a worldwide decentralized network of computers having the ability to communicate with each other. The Internet has gained broad recognition as a viable medium for communicating and interacting across multiple networks. The World-Wide Web (Web) was created in the early 1990's, and is comprised of server-hosting computers (Web servers) connected to the Internet that have hypertext documents (referred to as Web pages) stored therewithin. Web pages are accessible by client programs (e.g., Web browsers) utilizing the Hypertext Transfer Protocol (HTTP) via a Transmission Control Protocol/Internet Protocol (TCP/IP) connection between a client-hosting device and a server-hosting device. While HTTP and hypertext documents are the prevalent forms for the Web, the Web itself refers to a wide range of protocols including Secure Hypertext Transfer Protocol (HTTPS), File Transfer Protocol (FTP), and Gopher, and content formats including plain text, Extensible Markup Language (XML), as well as image formats such as Graphics Interchange Format (GIF) and Joint Photographic Experts Group (JPEG).

Exemplary Web browsers for Internet use include Netscape Navigator (America Online, Inc., Dulles, Va.) and Internet Explorer (Microsoft Corporation, Redmond, Wash.). Web browsers typically provide a graphical user interface for retrieving and viewing Web pages, applications, and other resources hosted by Internet servers (hereinafter referred to as "Web servers").

As is known to those skilled in this art, a Web page is conventionally formatted via a standard page description language such as HyperText Markup Language (HTML), which typically contains text and can reference graphics, sound, animation, and video data. HTML provides for basic document formatting and allows a Web content provider to specify anchors or hypertext links (typically manifested as highlighted text) to other Web servers and files (such as JSP files). When a user selects a particular hypertext link, a Web browser reads and interprets an address, called a Uniform Resource Locator (URL) associated with the link, connects the Web browser with a Web server at that address, and makes a request (e.g., an HTTP request) for the file identified in the link. The Web server then sends the requested file to the Web client which the Web browser interprets and displays to the user.

HyperText Markup Language (HTML)

HTML utilizes various tags that control format attributes and that identify different portions of a document (i.e., <$tag_{13}$ name>text</$tag_{13}$ name>). Tags are conventionally denoted by the "< >" symbols, with the actual tag between the brackets. Most markup language tags have an opening tag "<tag>" and a closing tag "</tag>." A tag is a singular entity that opens or closes an element. For instance, the <P> HTML tag opens a paragraph element. Likewise, the </P> HTML tag closes a paragraph element. These two tags, plus the content between them, represent the HTML element. A tag is only part of an element, not the element itself. The HTML language is described in the HTML Reference Manual, Jan. 2, 1996, published by Sandia National Laboratories, which is incorporated herein by reference, in its entirety.

JSP Technology

Figure 1:
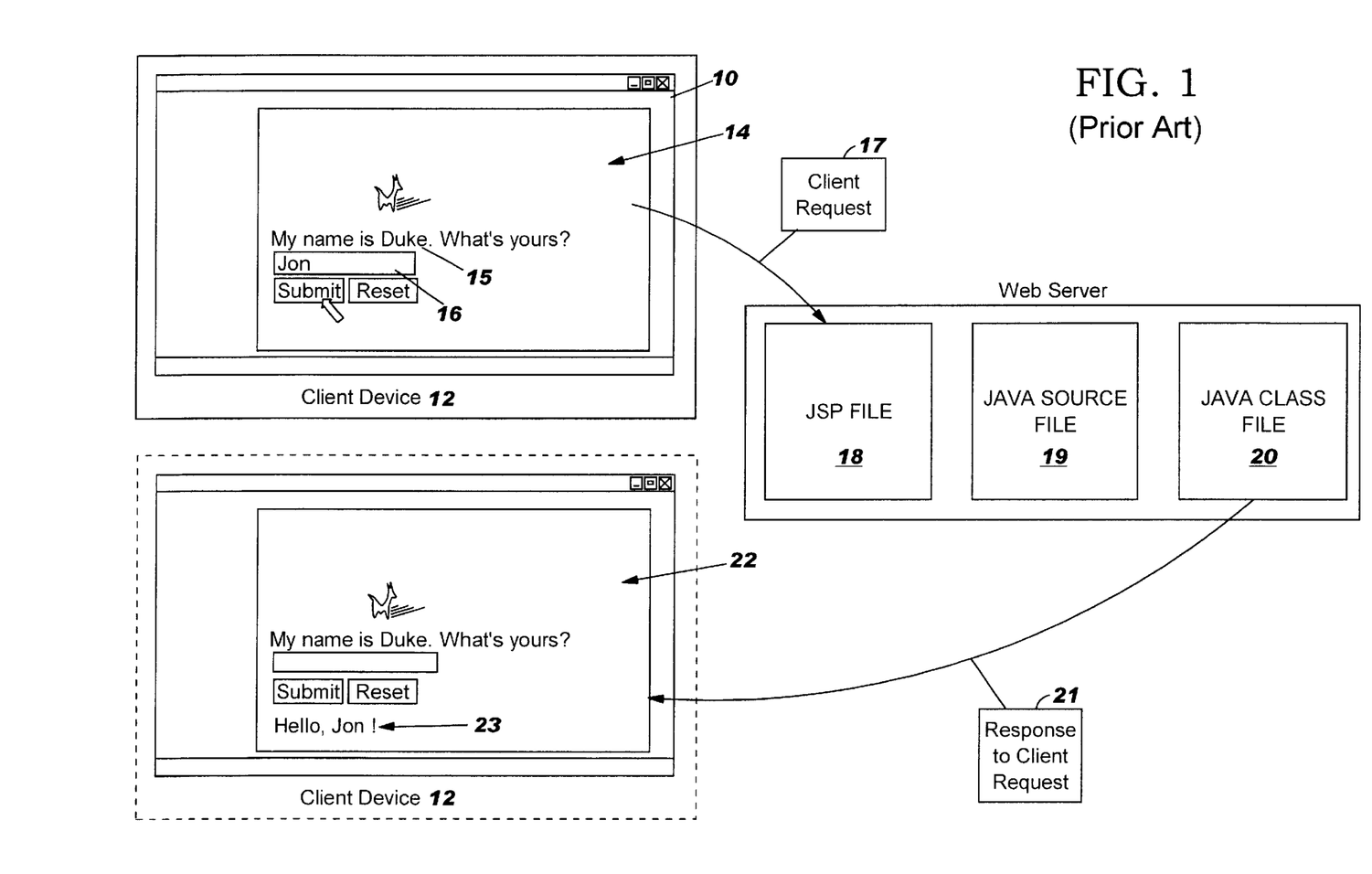
FIG. 1 schematically illustrates a client making a request to a JSP file on a Web server to perform some action on data entered within a field in a Web page displayed by the client.

Referring to FIG. 1, the user interface 10 of a browser (client) running within a client device 12, such as personal computer, is illustrated. Within the illustrated browser user interface 10 is displayed a Web page 14. The displayed Web page 14 includes an input field 15 in which a user has entered some data. By activating the "Submit" button 16, a client request (represented schematically as 17) to perform some action on the data entered in the field 15 is submitted to a JSP file 18 identified within the displayed Web page 14.

When the client request 17 is received by a Web server hosting the JSP file 18, a Java source file 19 is created that contains Java source code representing the markup language source code of the called JSP file 18. The Java source file 19 is compiled by a Java compiler to produce a Java class file 20. The Java class file 20 is then executed by a JVM to perform the requested action and return a response (represented schematically as 21) to the requesting client 10. The Web page 22 displayed within the browser user interface 10 contains the generated response, which is the text "Hello, Jon!" indicated as 23.

Referring to FIG. 2, the JSP file 18, Java source file 19, and Java class file 20 of FIG. 1 are illustrated in greater detail. The illustrated JSP file 18 has the filename "USER.JSP" and contains markup language source code. The illustrated markup language source code includes HTML tags and JSP tags, as would be understood by those of skill in the art.

The illustrated Java source file 19 has the filename "USER.JAVA" and contains source code written in the Java programming language. Elements of the Java source code represent the various markup language tags within the JSP file 18. The illustrated Java class file 20 has the filename "USER.CLASS" and contains compiled Java code or "bytecode" (machine code) that is generated when the source code within the Java source file 19 is compiled by a Java compiler 24.

Java bytecode is platform-independent code that is executable by a JVM. As is understood by those of skill in the art, a JVM serves as an interpreter between the bytecode's set of instructions and a real computer processor's set of instructions.

Figure 3:
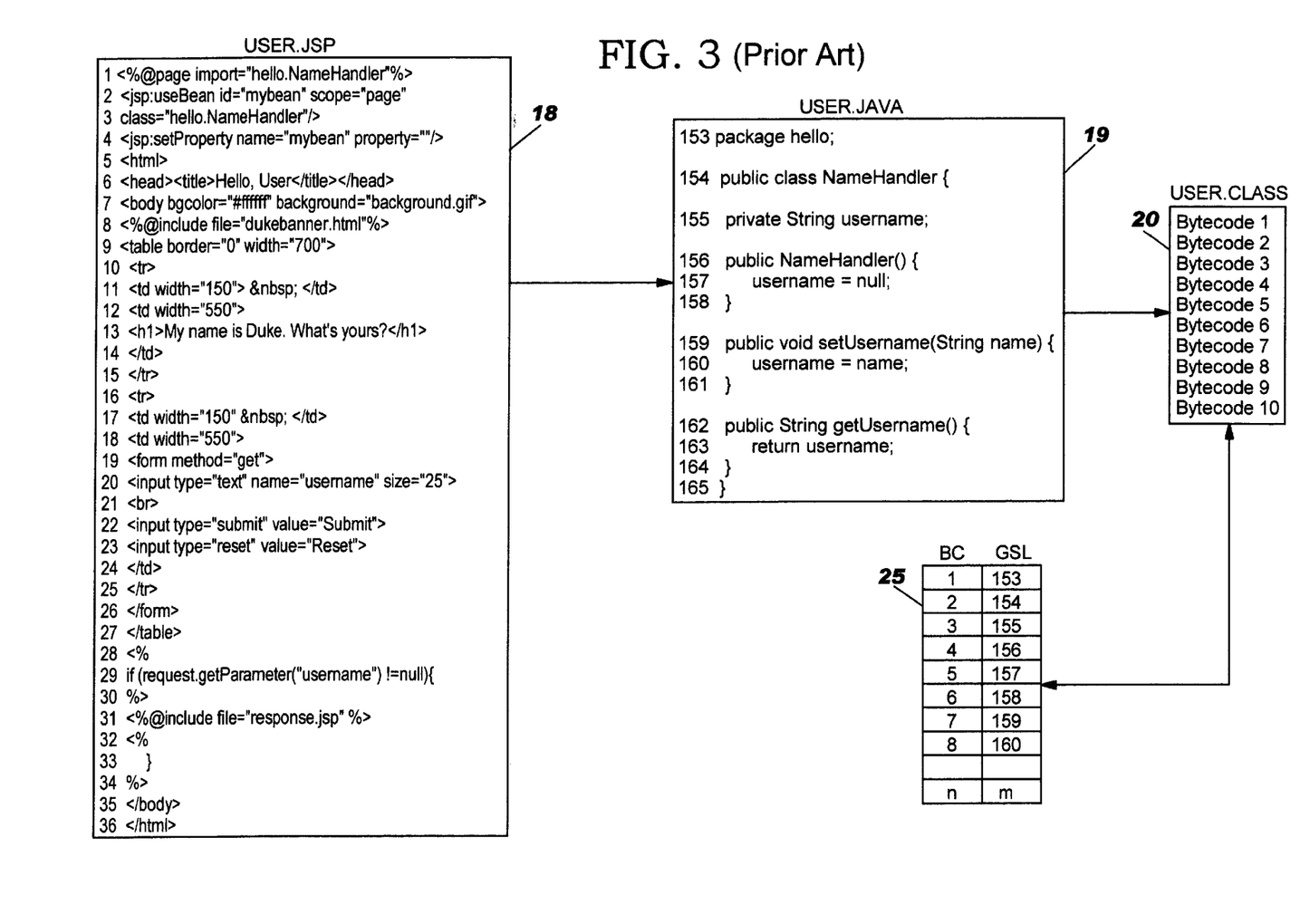
FIG. 3 schematically illustrates a source-to-bytecode table associated with a compiled Java class file that contains information that links or associates each bytecode within the Java class file with respective lines of the Java source code within the Java source file.

Referring now to FIG. 3, a source-to-bytecode table 25 associated with the compiled Java class file 20 is illustrated. The illustrated source-to-bytecode table 25 contains a listing of bytecode contained within the Java class file 20 and a corresponding listing, by line number of source code within the Java source file 19 that corresponds with the bytecode. For example, bytecode 1 corresponds to line 153 of the Java source code within the Java source file 19, bytecode 2 corresponds to line 154 of the Java source code within the Java source file 19, and so forth. Existing debugger tools for debugging compiled Java class files utilize source-to-bytecode tables to display the source code of the intermediate Java source file.

Debugging JSP Files Via Compiled Class Files

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

Computer program code for carrying out operations of the present invention is preferably written in an object oriented programming language such as Java, Smalltalk or C++. However, the computer program code for carrying out operations of the present invention may also be written in conventional procedural programming languages, such as the "C" programming language, or functional (or fourth generation) programming languages such as Lisp, SML, or Forth.

The program code for carrying out operations of the present invention may execute entirely on one or more data processors. For example, the program code for carrying out operations of the present invention may reside on a single host data processing system, such as a Web server, or on different machines interconnected over a network (e.g., the Internet, an intranet, a wide area network (WAN) or local area network (LAN)). Thus, a data processing system running the present invention has appropriate networking hardware to establish a connection out to another data processing system. For example, the data processing system may have a TCP/IP or NETBIOS connection to a network running over a token ring or Ethernet adapter.

The present invention is described below with reference to block diagrams and/or flowchart illustrations of methods, apparatus (systems) and computer program products according to an embodiment of the invention. It is understood that each block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions specified in the block diagram and/or flowchart block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the block diagram and/or flowchart block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the block diagrams and/or flowchart block or blocks.

Figure 4:
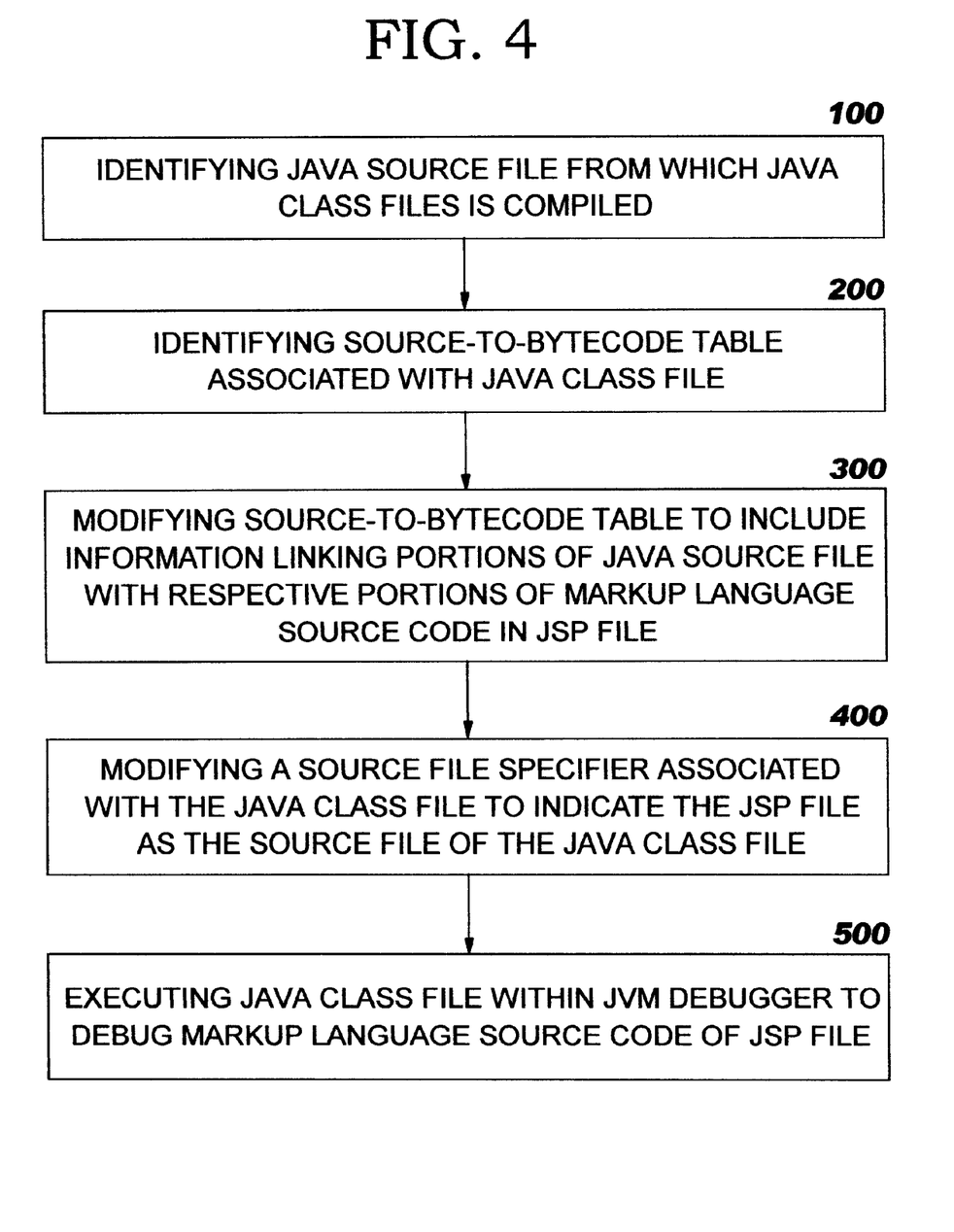
FIG. 4 schematically illustrates operations for debugging a scripting language file, such as a JSP file, according to the present invention.
Figure 5:
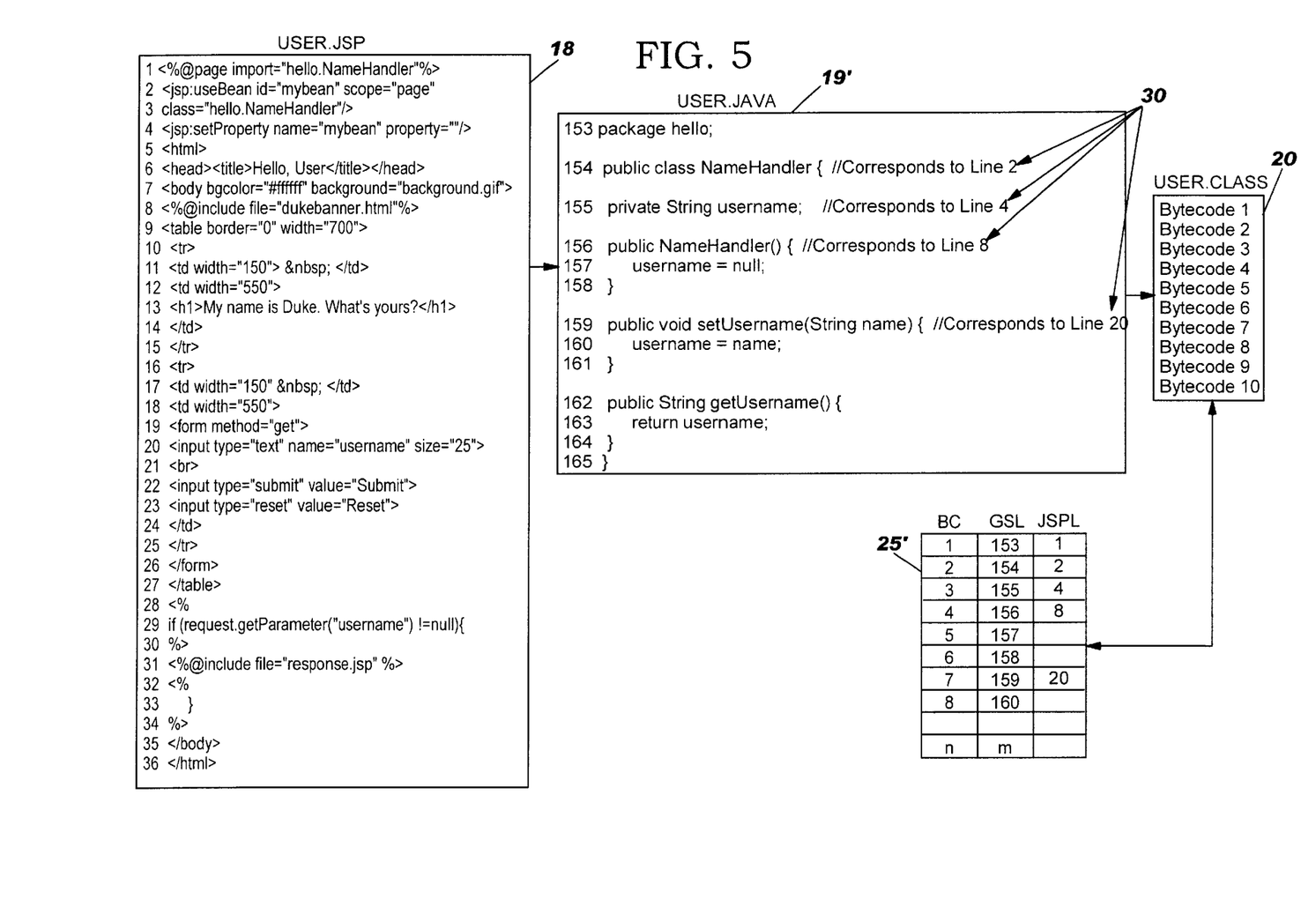
FIG. 5 illustrates a source-to-bytecode table modified to link bytecode within the Java class file with respective lines of markup language source code in the JSP file, according to the present invention.

Referring now to FIGS. 4 and 5, operations for debugging a JSP file containing markup language source code via a compiled Java class file according to the present invention are illustrated. As described above, a JSP file, in response to a client request therefor, is configured to be converted to an intermediate Java source file which contains Java source code. According to the present invention, the Java source file is edited to include information that identifies portions of the Java source code that correspond to respective portions of the markup language source code in the JSP file.

For example, as illustrated in FIG. 5, non-executable comments 30 are included within the Java code to indicate which portions of the markup language source code of the JSP file 18 correspond to which elements of the Java source code within the Java source file 19'. For example, line 154 of the Java source code corresponds to line 2 of the markup language source code of the JSP file 18. Similarly, line 155 of the Java source code corresponds to line 4 of the markup language source code of the JSP file 18, and so forth.

As seen in FIG. 4, according to the present invention, the intermediate Java source file from which a Java class file is compiled is identified (Block 100). This may be accomplished by introspecting the Java class file to locate a source file specifier associated with the Java class file. As is known to those of skill in the art, introspection refers to the process of examining a Java class file to determine the properties, events, and methods the Java class file supports. Introspection is well understood by those of skill in the art, and need not be described further herein. A source file specifier is included within a Java class file to "point" to the Java source file from which the Java class file was compiled. Source file specifiers are well understood by those of skill in the art and need not be described further herein.

In addition, one or more source-to-bytecode tables associated with the Java class file are identified (Block 200). Preferably, this step is also performed via introspection. As described above each source-to-bytecode table includes information that links or associates bytecode within the Java class file with a respective portion of the Java source code within the identified Java source file.

The identified source-to-bytecode tables are then modified to include information that links respective portions of the Java source code with respective portions of the markup language source code of the JSP file (Block 300). The information provided within the comments of the Java source file source code is extracted and used to modify identified source-to-bytecode tables. For example, as illustrated in FIG. 5, the information within the comment on line 153 of the Java source code of the Java source file 19' is appended within the modified source-to-bytecode table 25'. Thus, the modified source-to-bytecode table 25' includes a link between bytecode 1, line 153 of the Java source file source code, and line 1 of the markup language source code of the JSP file 18. The modified source-to-bytecode table 25' includes each comment from the Java source file 19' so as to link each bytecode with a corresponding portion of the markup language source code of the JSP file 18.

In addition, the located source file specifier is modified to indicate the JSP file as the source file from which the Java class file is compiled (Block 400). This step may be carried out by changing the file name and/or file name extension of the Java source file in the source file specifier to the file name and/or file name extension of the JSP file. For example, the filename extension "JAVA" of the source file specifier associated with the illustrated Java class file ("USER.CLASS") may be changed to "JSP".

After the source-to-bytecode tables have been modified as described above and the source file specifier has been modified to indicate the JSP file as the source file of the Java class file, the Java class file can be executed within a JVM debugger tool to debug the markup language source code of the JSP file (Block 500). The debugger tool is thereby "fooled" into believing that the markup language source code of the JSP file matches the bytecode of the compiled Java class file.

The present invention may provide significant advantages over the prior art. The present invention allows a user to debug JSP files by stepping through his/her original markup language source code, rather than generated Java source code which may be meaningless to the user. Modifications made to source-to-bytecode tables and source file specifiers are automatic and invisible to a user. In addition, because modifications are self-contained within a Java class file, a Java class file modified according to the present invention may be debugged using virtually any Java debugger tool.

Figure 6:
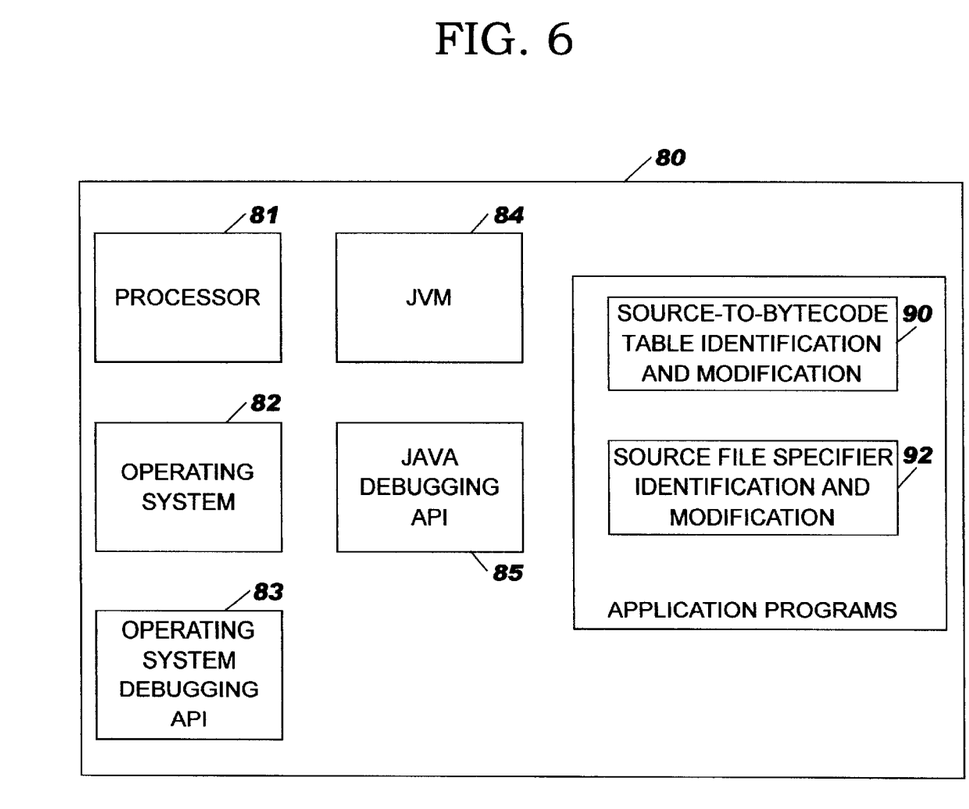
FIG. 6 illustrates an exemplary data processing system for use in implementing the present invention.

Referring now to FIG. 6, a data processing system for use in implementing the present invention is shown. The data processing system 80, has a processor, 81, an operating system 82, an operating system debug application programming interface (API) 83, and a Java Virtual Machine (JVM) interpreter 84. The JVM includes an instruction set and uses various memory area. The JVM has an associated Java debugging API 85 that enables an application developer to debug Java code. Further details about the JVM may be obtained in The Java Virtual Machine Specification, Second Edition, 1999, by Lindholm et al., available from Sun Microsystems, Inc. at http://java.sun.com/docs/books/vmspec/2nd-edition/html/vmspecTOC.doc.html, and which is incorporated herein by reference in its entirety.

An application program 90 for identifying and modifying source-to-bytecode tables according to the present invention may run on the operating system 82. An application program 92 for identifying and modifying a source file specifier may also run on the operating system 82.

Exemplary data processing systems in which the present invention may be utilized include, but are not limited to, Sun Microsystems®, Apple®, IBM®, and IBM®-compatible personal computers and workstations. However, it is to be understood that various computing devices and processors may be utilized to carry out the present invention without being limited to those enumerated herein. Exemplary operating systems within which the present invention may be utilized include, but are not limited to, UNIX, Windows 95, Windows 95, and Windows NT.

A representative data processing system for implementing the present invention runs an Intel x86 processor, the OS/2 Warp Version 3 operating system, the DosDebug system API and JVM Version 1.1.1 having the sun.tools.debug API. Alternatively, the data processing system runs an x86 processor, the Windows '95 (or Windows NT) operating system, WinDebug and JVM Version 1.1.1. Yet another alternative is to run a computer having an x86 processor, the AIX operating system, PTrace debug system API and JVM 1.1.1. Preferably, a data processing system for practicing the present invention includes a system debug API and a JVM having a Java debug API. However, it is understood that the present invention may be practiced via data processing systems implementing various operating systems and system debugging APIs. Any suitable JVM interpreter (having an associated Java debug API) may also be used.

The present invention is not limited to debugging JSP files using compiled Java class files. The present invention may be practiced to debug virtually any scripting language file from which a compiled object class file is generated. For example, a scripting file from which a C++ class file is generated may be debugged according to the present invention using a C++ debugger tool.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clause are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A method of debugging a Java Server Page (JSP) file via a Java Virtual Machine (JVM) debugger tool, wherein the JSP file, in response to a client request therefor, is configured to be converted to a Java source file which can be compiled and executed as a Java class file, wherein the JSP file comprises a markup language source code, wherein the Java source file comprises Java source code and information that identifies portions of the Java source code that correspond to respective portions of the markup language source code in the JSP file, and wherein the Java class file comprises Java bytecode that, when executed, returns a response to the client request, the method comprising the steps of:

locating a source file specifier within a Java class file that identifies a Java source file from which the Java class file is compiled;

identifying at least one source-to-bytecode table associated with the Java class file, wherein the at least one source-to-bytecode table comprises information that associates bytecode within the Java class file with a respective portion of the Java source code within the identified Java source file;

modifying the identified at least one source-to-bytecode table to include information that associates respective portions of the Java source code with respective portions of the markup language source code of the JSP file;

modifying the located source file specifier to indicate the JSP file as the source file from which the Java class file is compiled; and executing the Java class file within a JVM debugger tool to debug the markup language source code of the JSP file.

2. A method according to claim 1 wherein the step of identifying the Java source file from which the Java class file was compiled comprises the step of subjecting the Java class file to introspection.

3. A method according to claim 1 wherein the step of identifying at least one source-to-bytecode table associated with the Java class file comprises the step of subjecting the Java class file to introspection.

4. A method according to claim 1 wherein the information that associates bytecode within the Java class file with a respective portion of the Java source code within the identified Java source file is included within the Java source code in a non-executable format.

5. A method according to claim 1 wherein the at least one source-to-bytecode table associated with the Java class file comprises a plurality of source-to-bytecode tables associated with the Java class file.

6. A method according to claim 1 wherein the step of modifying the located source file specifier comprises the step of changing a file name extension of the identified Java source file in the located source file specifier to a file name extension of the JSP file.

7. A method of debugging a scripting language (SL) file via an Object Oriented Programming (OOP) language debugger tool, wherein the SL file, in response to a client request therefor, is configured to be converted to an OOP language source file which can be compiled and executed as an OOP language class file, wherein the SL file comprises a markup language source code, wherein the OOP language source file comprises OOP language source code and information that identifies portions of the OOP language source code that correspond to respective portions of the markup language source code in the SL file, and wherein the OOP language class file comprises OOP language object code that, when executed, returns a response to the client request, the method comprising the steps of:

identifying an OOP language source file from which an OOP language class file is compiled;

identifying at least one source-to-object code table associated with the OOP language class file, wherein the at least one source-to-object code table comprises information that associates object code within the OOP language class file with a respective portion of the OOP language source code within the identified OOP language source file;

modifying the identified at least one source-to-object code table to include information that associates respective portions of the OOP language source code with respective portions of the markup language source code of the SL file;

modifying a name of the identified source file to a file name extension of the SL file; and executing the OOP language class file within an OOP language debugger tool to debug the markup language source code of the SL file.

8. A method according to claim 7 wherein the step of identifying the OOP language source file from which the OOP language class file was compiled comprises the step of subjecting the OOP language class file to introspection.

9. A method according to claim 7 wherein the step of identifying at least one source-to-object code table associated with the OOP language class file comprises the step of subjecting the OOP language class file to introspection.

10. A method according to claim 7 wherein the information that associates object code within the OOP language class file with a respective portion of the OOP language source code within the identified OOP language source file is included within the OOP language source code in a non-executable format.

11. A method according to claim 7 wherein the at least one source-to-object code table associated with the OOP language class file comprises a plurality of source-to-object code tables associated with the OOP language class file.

12. A method according to claim 7 wherein the step of modifying the located source file specifier comprises the step of changing a file name extension of the identified OOP language source file in the located source file specifier to a file name extension of the SL file.

13. A system for debugging a Java Server Page (JSP) file via a Java Virtual Machine (JVM) debugger tool, wherein the JSP file, in response to a client request therefor, is configured to be converted to a Java source file which can be compiled and executed as a Java class file, wherein the JSP file comprises a markup language source code, wherein the Java source file comprises Java source code and information that identifies portions of the Java source code that correspond to respective portions of the markup language source code in the JSP file, and wherein the Java class file comprises Java bytecode that, when executed, returns a response to the client request, comprising:

means for locating a source file specifier within a Java class file that identifies a Java source file from which the Java class file is compiled;

means for identifying at least one source-to-bytecode table associated with the Java class file, wherein the at least one source-to-bytecode table comprises information that associates bytecode therewithin with a respective portion of the Java source code within the identified Java source file;

means for modifying the identified at least one source-to-bytecode table to include information that associates respective portions of the Java source code with respective portions of the markup language source code of the JSP file;

means for modifying the located source file specifier to indicate the JSP file as the source file from which the Java class file is compiled; and means for executing the Java class file within a JVM debugger tool to debug the markup language source code of the JSP file.

14. A system according to claim 13 wherein the means for identifying the Java source file from which the Java class file was compiled comprises means for subjecting the Java class file to introspection.

15. A system according to claim 13 wherein the means for identifying at least one source-to-bytecode table associated with the Java class file comprises means for subjecting the Java class file to introspection.

16. A system according to claim 13 wherein the information that associates bytecode within the Java class file with a respective portion of the Java source code within the identified Java source file is included within the Java source code in a non-executable format.

17. A system according to claim 13 wherein the at least one source-to-bytecode table associated with the Java class file comprises a plurality of source-to-bytecode tables associated with the Java class file.

18. A system according to claim 13 wherein the means for modifying the located source file specifier comprises means for changing a file name extension of the identified Java source file in the located source file specifier to a file name extension of the JSP file.

19. A system for debugging a scripting language (SL) file via an Object Oriented Programming (OOP) language debugger tool, wherein the SL file, in response to a client request therefor, is configured to be converted to an OOP language source file which can be compiled and executed as an OOP language class file, wherein the SL file comprises a markup language source code, wherein the OOP language source file comprises OOP language source code and information that identifies portions of the OOP language source code that correspond to respective portions of the markup language source code in the SL file, and wherein the OOP language class file comprises OOP language object code that, when executed, returns a response to the client request, comprising:

means for identifying an OOP language source file from which an OOP language class file is compiled;

means for identifying at least one source-to-object code table associated with the OOP language class file, wherein the at least one source-to-object code table comprises information that associates object code within the OOP language class file with a respective portion of the OOP language source code within the identified OOP language source file;

means for modifying the identified at least one source-to-object code table to include information that associates respective portions of the OOP language source code with respective portions of the markup language source code of the SL file;

means for modifying a name of the identified source file to a file name extension of the SL file; and means for executing the OOP language class file within an OOP language debugger tool to debug the markup language source code of the SL file.

20. A system according to claim 19 wherein the means for identifying the OOP language source file from which the OOP language class file was compiled comprises means for subjecting the OOP language class file to introspection.

21. A system according to claim 19 wherein the means for identifying at least one source-to-object code table associated with the OOP language class file comprises means for subjecting the OOP language class file to introspection.

22. A system according to claim 19 wherein the information that associates object code within the OOP language class file with a respective portion of the OOP language source code within the identified OOP language source file is included within the OOP language source code in a non-executable format.

23. A system according to claim 19 wherein the at least one source-to-object code table associated with the OOP language class file comprises a plurality of source-to-object code tables associated with the OOP language class file.

24. A system according to claim 19 wherein the means for modifying the located source file specifier comprises means for changing a file name extension of the identified OOP language source file in the located source file specifier to a file name extension of the SL file.

25. A computer program product for debugging a Java Server Page (JSP) file via a Java Virtual Machine (JVM) debugger tool, wherein the JSP file, in response to a client request therefor, is configured to be converted to a Java source file which can be compiled and executed as a Java class file, wherein the JSP file comprises a markup language source code, wherein the Java source file comprises Java source code and information that identifies portions of the Java source code that correspond to respective portions of the markup language source code in the JSP file, and wherein the Java class file comprises Java bytecode that, when executed, returns a response to the client request, the computer program product comprising a computer usable storage medium having computer readable program code means embodied in the medium, the computer readable program code means comprising:

computer readable program code means for locating a source file specifier within a Java class file that identifies a Java source file from which the Java class file is compiled;

computer readable program code means for identifying at least one source-to-bytecode table associated with the Java class file, wherein the at least one source-to-bytecode table comprises information that associates bytecode within the Java class file with a respective portion of the Java source code within the identified Java source file;

computer readable program code means for modifying the identified at least one source-to-bytecode table to include information that associates respective portions of the Java source code with respective portions of the markup language source code of the JSP file;

computer readable program code means for modifying the located source file specifier to indicate the JSP file as the source file from which the Java class file is compiled; and computer readable program code means for executing the Java class file within a JVM debugger tool to debug the markup language source code of the JSP file.

26. A computer program product according to claim 25 wherein the computer readable program code means for identifying the Java source file from which the Java class file was compiled comprises computer readable program code means for subjecting the Java class file to introspection.

27. A computer program product according to claim 25 wherein the computer readable program code means for identifying at least one source-to-bytecode table associated with the Java class file comprises computer readable program code means for subjecting the Java class file to introspection.

28. A computer program product according to claim 25 wherein the information that associates bytecode within the Java class file with a respective portion of the Java source code within the identified Java source file is included within the Java source code in a non-executable format.

29. A computer program product according to claim 25 wherein the at least one source-to-bytecode table associated with the Java class file comprises a plurality of source-to-bytecode tables associated with the Java class file.

30. A computer program product according to claim 25 wherein the computer readable program code means for modifying the located source file specifier comprises computer readable program code means for changing a file name extension of the identified Java source file in the located source file specifier to a file name extension of the JSP file.

31. A computer program product for debugging a scripting language (SL) file via an Object Oriented Programming (OOP) language debugger tool, wherein the SL file, in response to a client request therefor, is configured to be converted to an OOP language source file which can be compiled and executed as an OOP language class file, wherein the SL file comprises a markup language source code, wherein the OOP language source file comprises OOP language source code and information that identifies portions of the OOP language source code that correspond to respective portions of the markup language source code in the SL file, and wherein the OOP language class file comprises OOP language object code that, when executed, returns a response to the client request, the computer program product comprising a computer usable storage medium having computer readable program code means embodied in the medium, the computer readable program code means comprising:

computer readable program code means for identifying an OOP language source file from which an OOP language class file is compiled;

computer readable program code means for identifying at least one source-to-object code table associated with the OOP language class file, wherein the at least one source-to-object code table comprises information that associates object code within the OOP language class file with a respective portion of the OOP language source code within the identified OOP language source file;

computer readable program code means for modifying the identified at least one source-to-object code table to include information that associates respective portions of the OOP language source code with respective portions of the markup language source code of the SL file;

computer readable program code means for modifying a name of the identified source file to a file name extension of the SL file; and computer readable program code means for executing the OOP language class file within an OOP language debugger tool to debug the markup language source code of the SL file.

32. A computer program product according to claim 31 wherein the computer readable program code means for identifying the OOP language source file from which the OOP language class file was compiled comprises computer readable program code means for subjecting the OOP language class file to introspection.

33. A computer program product according to claim 31 wherein the computer readable program code means for identifying at least one source-to-object code table associated with the OOP language class file comprises computer readable program code means for subjecting the OOP language class file to introspection.

34. A computer program product according to claim 31 wherein the information that associates object code within the OOP language class file with a respective portion of the OOP language source code within the identified OOP language source file is included within the OOP language source code in a non-executable format.

35. A computer program product according to claim 31 wherein the at least one source-to-object code table associated with the OOP language class file comprises a plurality of source-to-object code tables associated with the OOP language class file.

36. A computer program product according to claim 31 wherein the computer readable program code means for modifying the located source file specifier comprises computer readable program code means for changing a file name extension of the identified OOP language source file in the located source file specifier to a file name extension of the SL file.

* * * * *